(12) United States Patent  
Pollard et al.

(10) Patent No.: US 7,617,639 B1  
(45) Date of Patent: Nov. 17, 2009

(54) TAPE-SPRING DEPLOYABLE BOOM

(75) Inventors: Eric L. Pollard, Albuquerque, NM (US); Thomas W. Murphey, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 263 days.

(21) Appl. No.: 11/463,063

(22) Filed: Aug. 8, 2006

(51) Int. Cl.
*E04H 12/00* (2006.01)
*E04H 12/18* (2006.01)
*H01Q 1/08* (2006.01)

(52) U.S. Cl. .................. 52/108; 52/111; 52/110; 52/648.1; 52/632; 343/915

(58) Field of Classification Search ........... 52/111–121, 52/648.1–649.5, 108, 632, 645, 646; 343/880, 343/877, 916, 874, 875, 915, 883
See application file for complete search history.

(56) References Cited

U.S. PATENT DOCUMENTS

| | | | | |
|---|---|---|---|---|
| 3,474,488 | A * | 10/1969 | Kruzich ..................... | 16/225 |
| 4,047,339 | A * | 9/1977 | Smith et al. ................. | 52/108 |
| 4,578,919 | A * | 4/1986 | Amadon et al. .............. | 52/645 |
| 4,587,777 | A * | 5/1986 | Vasques et al. .............. | 52/108 |
| 4,662,130 | A * | 5/1987 | Miura et al. ................. | 52/108 |
| 4,866,892 | A * | 9/1989 | Satoh et al. ................. | 52/108 |
| 4,887,397 | A * | 12/1989 | Peterson ..................... | 52/86 |
| 4,958,474 | A * | 9/1990 | Adams ........................ | 52/646 |
| 5,003,736 | A * | 4/1991 | Okazaki et al. .............. | 52/108 |
| 5,085,018 | A * | 2/1992 | Kitamura et al. ............. | 52/108 |
| 5,154,027 | A * | 10/1992 | Warden ....................... | 52/108 |
| 5,163,262 | A * | 11/1992 | Adams ........................ | 52/646 |
| 6,772,479 | B2 * | 8/2004 | Hinkley et al. .............. | 16/225 |
| 6,904,722 | B2 * | 6/2005 | Brown et al. ................ | 52/121 |
| 6,920,722 | B2 * | 7/2005 | Brown et al. ................ | 52/108 |
| 6,970,143 | B2 * | 11/2005 | Allen et al. ................. | 343/880 |
| 2002/0112417 | A1 * | 8/2002 | Brown et al. ................ | 52/108 |

OTHER PUBLICATIONS

AFRL presentation, "Novel, Concentrated Strain Deployable Architectures Utilizing SMA Flexures," Aug 16, 2005.
Tang-Tat Ng, "Behavior of a deployable structure with composite tape-springs," 15th Int'l Conf. on Composite Materials, Durban SA, Jun. 27-Jul. 1, 2005.
Murphey, TW, "A material structural performance index for strain based deployable trusses," AIAA 2004-1656, Apr.19-22, 2004.
Ng, TT and Murphey, TW, "A novel deployable boom with flexible hinges," AIAA 2005-2197, Apr. 18-21, 2005.
Pollard, EL & Murphey, TW, "Development of deployable elastic composite SMA reinforced structures," AIAA 2006-1681, May 1-4, 2006.

* cited by examiner

*Primary Examiner*—Brian E Glessner
*Assistant Examiner*—Jason Holloway
(74) *Attorney, Agent, or Firm*—James S Korich; Kenneth E. Callahan

(57) ABSTRACT

A self-deployable, monolithic, open-lattice frame structure of resilient, tape-spring members. The structure is comprised of three or more longitudinal prismatic tape-spring members (longerons) and non-prismatic tape-spring members (battens) that are connected transversely to the longerons. The longerons can be reconfigured in a z-folding manner to compact the structure. The batten members have a twist at each end of the same magnitude and sense, such that when connected to the longerons, the concave surfaces of the battens substantially face along the longitudinal direction of the frame structure. This batten shape permits them to nest within adjacent battens when the structure is compacted.

3 Claims, 3 Drawing Sheets

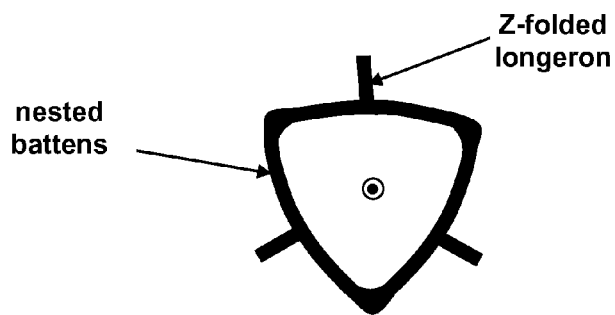
**FIG. 6 Compacted Truss Structure
Viewed Along the Primary Frame Structural Axis - 4**
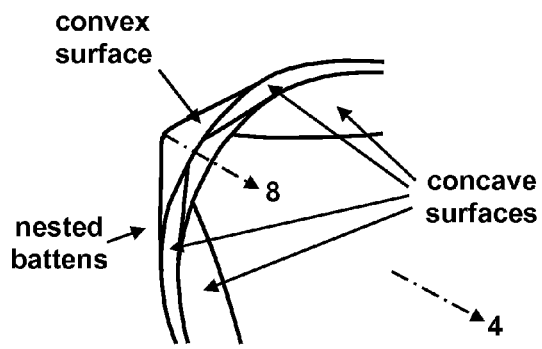
FIG. 7
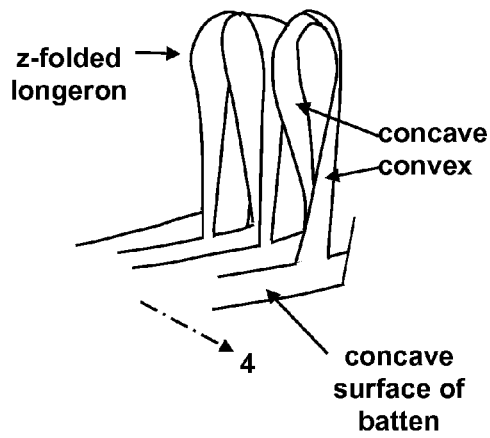
FIG. 8

TAPE-SPRING DEPLOYABLE BOOM

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention is related to self-deployable structures, and in particular to a frame architecture constructed of carbon fiber reinforced plastic tape-spring members or members with a curved, thin-walled, and open form.

Hierarchical structures are comprised of members with cross-section geometry which respond with greater rigidity and stability per area, i.e., a thin-walled, open-form cross-section is considered to have greater hierarchy than a solid rod of equivalent cross-section area. Such architectures are desirable as they offer greater structural performance per mass. It has not been obvious how to incorporate hierarchy into deployable structural systems or how to realize these systems of monolithic construction. Monolithic or single-piece fabrication avoids introducing imprecision arising from mechanical connections and allows the exploitation of stored strain energy to motivate self-deployment since material must be deformed and thus strained to reconfigure. Self-deploying structures exploit the mass, volume, and power otherwise allocated to attendant active deployment mechanisms to increase deployed structural performance. Prior art has focused on architectures which require assembly or the joining of individual members to acquire the deployed configuration, architectures with mechanical joint features, monolithic, hierarchical architectures which lack transverse members, architectures with limited hierarchy, and architectures with hierarchical tube members and limited packaging capability. There is a need for a self-deployable structure, having a packaged or compact configuration, with greater hierarchy and without mechanical joint features.

SUMMARY OF THE INVENTION

An embodiment of the present invention provides a self-deployable, monolithic, open-lattice frame structure of resilient tape-spring members. The structure is comprised of three or more longitudinal, tape-spring members (longerons) that can be reconfigured in a z-folding manner to compact and deploy the structure and of transverse, non-prismatic tape-spring members (battens) connected to the longerons. The batten members have a twist at each end of the same magnitude and sense, such that when connected to the longerons, the concave surfaces at mid-length of the battens face substantially along the longitudinal direction of the frame structure. This deployed batten configuration permits them to nest within adjacent battens when the frame structure is compacted. The strain capacity of the compacted longerons and battens can be utilized to deploy the structure.

BRIEF DESCRIPTION OF THE DRAWINGS

FIG. 6 is a symbolic representation of the structure in its compact configuration as viewed along the primary structural axis.

FIG. 7 shows a detail of two nested battens in the compacted configuration.

FIG. 8 is an example of a Z-folded longeron in a compacted configuration.

DESCRIPTION OF THE PREFERRED EMBODIMENT

Figure 1:
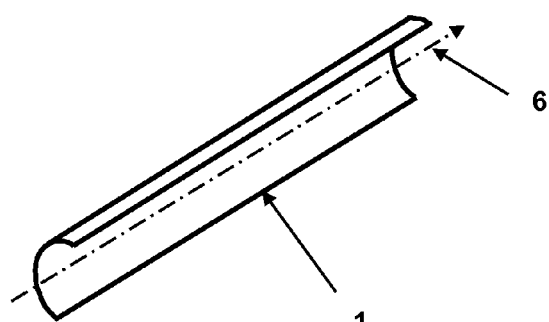
FIG. 1 depicts the tape-spring shape of a longeron segment. Each longeron extends along the entire longitudinal length of the frame structure.
Figure 2:
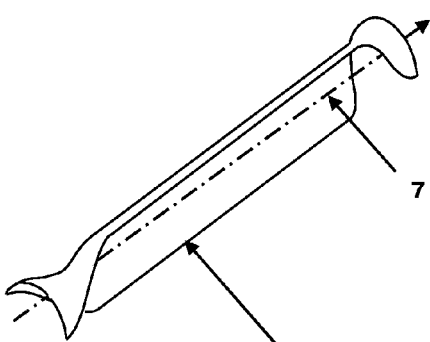
FIG. 2 illustrates the specialized shape of a batten for the structure.
Figure 3:
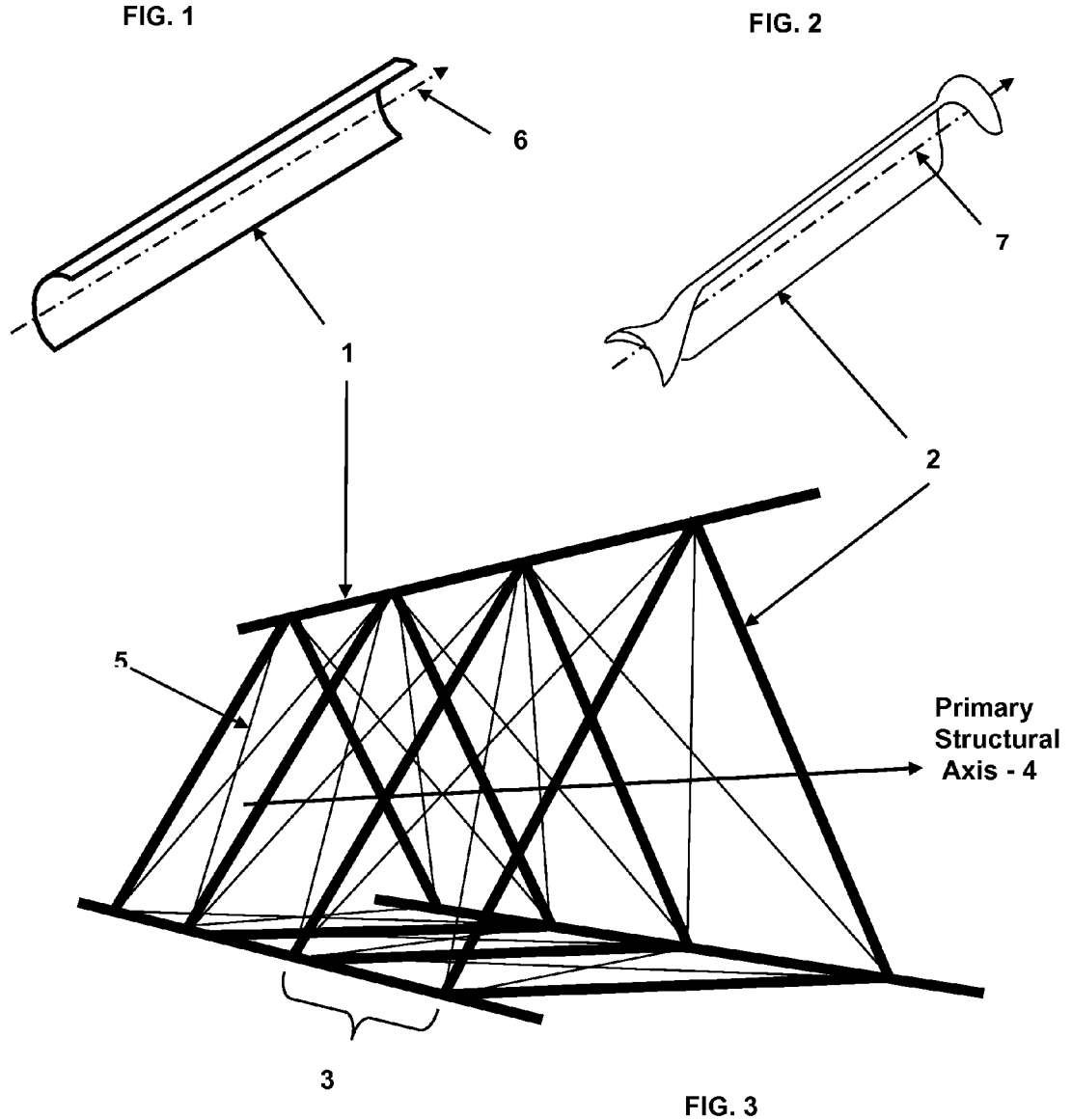
FIG. 3 is a generalized view of an open-lattice structure having a triangular cross-section.

An embodiment of the present invention provides a hierarchical, self-deployable, and monolithic open-lattice frame structure of resilient tape-spring members with both terrestrial and celestial utility. The structure is comprised of a plurality of longitudinal, tape-spring, and substantially prismatic members or longerons oriented parallel to and positioned at a radius from the structure's longitudinal or primary structural axis. A prismatic member is one which has a unique cross-section geometry which does not translate from or rotate about the member's primary axis along the length of the member (see FIG. 1). The longerons are connected together with transverse, tape-spring, and non-prismatic members or battens (see FIG. 2) forming triangular cross-section bays as in the case of the depicted three-longeron architecture of FIG. 3. Diagonal tension elements, such as cables, may also be disposed across the face of the bays, interfacing with the structure at points where battens connect with longerons. FIG. 3 shows one embodiment of the deployed frame structure with the longerons 1, battens 2, bays 3, diagonal tension elements 5, and primary structural axis 4 identified. The longerons may be attached at one end to a structure (not shown).

Figure 4:
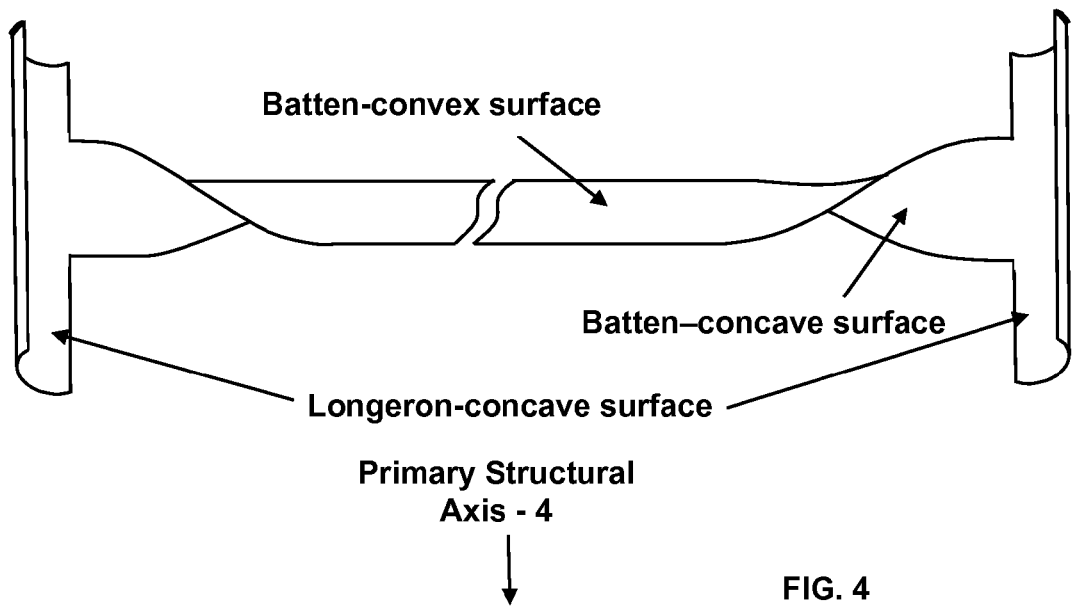
FIG. 4 is an example of a batten attached to two-longerons.
Figure 5:
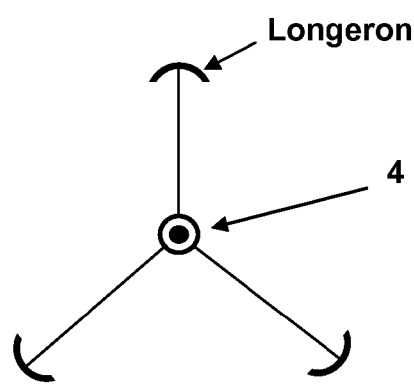
FIG. 5 is a cross-section of the structure showing only the longerons and their orientation.

The non-prismatic quality of a batten 2 arises from lofting a rotated tape-spring cross-section or twisting the tape-spring cross-section about the batten primary axis 7 at each end of the batten by the same magnitude and sense. The batten remains symmetric about its mid-length. The battens 2 of a structure are positioned symmetrically relative to the primary structural axis 4 and are oriented such that the normal axes to like concave surfaces of any two battens in the same angular position relative to the primary structural axis are parallel in either the compacted or deployed configurations. The battens may be flattened or assume a cross-section which is rectilinear and not arcuate at both ends to enable interfacing with the longerons. The longerons may be flattened at one end where they connect with a structure so that when Z-folded in the compacted configuration, the initial fold lies closer to the structure. The longerons and battens may be fabricated as a single piece as shown in FIG. 4, but they may also be attached by various means known in the art, including by mechanical fasteners or by adhesives. FIG. 5 shows the preferred longeron orientation in cross-section with the concave surface facing inward to the primary structural axis. However, the longerons may also be reversed with the concave surface facing outward.

Longerons 1 and battens 2 are preferably made of carbon fiber reinforced plastic (CFRP). Other suitable materials include fiber glass reinforced plastic, polymer fiber reinforced plastic, unreinforced plastic, copper-beryllium alloy, and spring steel. The plurality of bays 3 comprising the structure is defined by the batten frequency along the primary structural axis 4 and the length of the structure.

The compacted configuration is obtained by bending the longerons at equally spaced points along the length of the structure and about alternating sense transverse axes relative to each longeron member, i.e., Z-folding the longerons. This movement results in a compact configuration with a first set of bending points which remain at a substantially fixed radius from the primary structural axis and a second set of bending points which increase in radial proximity to the primary structural axis. FIG. 6 is a symbolic representation of the structure in its compacted configuration as viewed along the primary structural axis 4. The battens preferably connect with the longerons near the second set of bending points. This connection point dictates the movement either end of the batten member undergoes; the ends increase in radial proximity to the primary structural axis 4 and rotate substantially pi/2 about an axis parallel to the nearest longeron z-fold, again for the depicted three-longeron architecture. When the non-prismatic battens 2 are subjected to this movement their utility is realized in the resulting deformed shape which lends itself to nesting within like deformed members with similar deployed geometry. This nesting quality can be characterized as a compacted shape where any axis parallel to the primary structural axis 4 passes through or is coincident with the batten only once, thus there is no overhanging geometry to obstruct the abutment of corresponding surfaces of a like compacted shape be it a batten of a previous or subsequently compacted bay. FIG. 7 shows a detail of two nested battens. The mid-length of a compacted batten has a flattened geometry with its transverse axis being approximately parallel to the primary structural axis 4. Without any such obstruction the longerons are free to bend to their designed strain capacity upon z-folding (see FIG. 8). The CFRP tape-spring members of this structure exploit the properties of high efficiency or high rigidity to mass ratio material systems and yield a compliant structure relevant to deployable space applications.

The invention claimed is:

1. A compactable frame structure having a deployed configuration and a compact configuration, comprising:
    a primary longitudinal axis;
    at least three longerons lying in parallel with the primary axis when the structure is in the deployed configuration;
    a plurality of battens connecting the longerons, with the battens lying transverse to the primary axis;
    the longerons and the battens being resilient;
    the longerons and the battens forming triangular cross-sectional bays when the structure is in the compact configuration;
    the longerons being at a longeron radius relative to the primary axis and being symmetrically positioned relative to the primary axis, when die structure is in the deployed configuration;
    each of the longerons bending both at a distal radius relative to the primary axis and at a proximal radius relative to the primary axis when the structure is in the compact configuration, with the distal radius being greater than the longeron radius and the proximal radius being less than the longeron radius;
    batten sets comprising three of the battens;
    each of the battens including a longitudinal batten axis;
    the three batten axes for the three battens, respectively, comprising each of the batten sets, lying in a batten set plane;
    the batten set planes perpendicularly intersecting the primary axis at equally spaced intervals;
    each of the battens including a concave surface, with each of the concave surfaces being intersected, respectively, by a normal line;
    each of the battens having an angular position relative to the primary axis; and
    the normal lines for any two of the battens having the same angular position being parallel.

2. A compactable frame structure as defined in claim 1, wherein the concave surfaces nest within one another when the structure is in the compact configuration.

3. A compactable frame structure as defined in claim 2, wherein each of the longerons has a concave surface facing towards the primary axis.

* * * * *